United States Patent
Mattson

(10) Patent No.: US 8,004,219 B2
(45) Date of Patent: Aug. 23, 2011

(54) OPERATING METHOD AND SYSTEM FOR HYBRID VEHICLE

(76) Inventor: Edward Wayne Mattson, Lake Shore, MN (US)

(*) Notice: Subject to any disclaimer, the term of this patent is extended or adjusted under 35 U.S.C. 154(b) by 521 days.

(21) Appl. No.: 12/219,400

(22) Filed: Jul. 22, 2008

(65) Prior Publication Data
US 2010/0019700 A1    Jan. 28, 2010

(51) Int. Cl.
*B60K 6/20* (2007.10)
(52) U.S. Cl. ............... 318/139; 180/65.21; 180/65.245; 180/65.28
(58) Field of Classification Search .......... 318/139–143, 318/146, 147, 151, 152, 157; 180/65.1, 65.21, 180/65.245, 65.28, 65.31
See application file for complete search history.

(56) References Cited

U.S. PATENT DOCUMENTS

| | | | | |
|---|---|---|---|---|
| 707,230 | A | 8/1902 | Henry | |
| 716,113 | A | 12/1902 | Schmid | |
| 871,098 | A | 11/1907 | Albrecht | |
| 1,064,089 | A | 6/1913 | Rayner | |
| 1,065,982 | A | 7/1913 | Stewart | |
| 1,204,146 | A | 11/1916 | Fend | |
| 1,606,547 | A | 11/1926 | Ward | |
| 1,655,100 | A | 1/1928 | Jensen | |
| 1,664,562 | A | 4/1928 | Jensen | |
| 1,671,033 | A | 5/1928 | Kimura | |
| 1,817,820 | A | 8/1931 | Higley | |
| 1,849,755 | A | 3/1932 | Fielder | |
| 1,951,089 | A | 3/1934 | Fielder | |
| 1,984,831 | A | 12/1934 | Higley | |
| 3,888,325 | A | 6/1975 | Reinbeck | |
| 4,269,280 | A | 5/1981 | Rosen | |
| 4,438,342 | A * | 3/1984 | Kenyon | 290/45 |
| 4,588,040 | A * | 5/1986 | Albright et al. | 180/165 |
| 5,301,764 | A * | 4/1994 | Gardner | 180/65.23 |
| 5,350,031 | A * | 9/1994 | Sugiyama et al. | 180/65.245 |
| 5,428,274 | A * | 6/1995 | Furutani et al. | 318/139 |
| 5,635,805 | A * | 6/1997 | Ibaraki et al. | 318/139 |
| 5,826,671 | A * | 10/1998 | Nakae et al. | 180/65.235 |
| 6,009,371 | A * | 12/1999 | Kobayashi | 701/112 |
| 6,443,126 | B1 * | 9/2002 | Morimoto et al. | 123/339.15 |
| 6,630,810 | B2 * | 10/2003 | Takemasa et al. | 320/104 |
| 6,661,109 | B2 | 12/2003 | Fukasaku et al. | |
| 7,255,662 | B2 * | 8/2007 | Hiroe et al. | 477/3 |

OTHER PUBLICATIONS

"Retrofit Hybrid-Electric System", *SIGMA Automotive*, printed on: May 7, 2008, four pages in length; online: http://www.sigmaautomotive.com/electrocharger/electrocharge.php.

* cited by examiner

*Primary Examiner* — Bentsu Ro
(74) *Attorney, Agent, or Firm* — The Nath Law Group; Laurie A. Axford

(57) ABSTRACT

A hybrid power plant for efficiently propelling a vehicle is described. In particular, an internal combustion motor and a generator capable of producing electrical energy is mechanically coupled to the internal combustion motor. An electrical motor is powered by the generator and a controller is coupled to the generator, providing control of the rate of electricity provided to the electrical motor by the generator. Here the electrical motor facilitates rotation of a wheel of the vehicle and the internal combustion motor is operated at an idle or near-idle speed to provide sufficient energy to be converted into electrical energy by the generator, thereby enabling the electrical motor to propel the vehicle in excess of sixty miles per hour, without engaging the internal combustion motor to the wheel and without drawing energy from the battery.

18 Claims, 3 Drawing Sheets

OPERATING METHOD AND SYSTEM FOR HYBRID VEHICLE

BACKGROUND

1. Field

This subject matter relates to hybrid propulsion. More particularly, it relates to methods and systems for hybrid propulsion for a motorized vehicle.

2. Background

Hybrid technology is recognized as an efficient bridge technology for increasing the fuel mileage of motorized vehicles by pairing conventional internal combustion engines (referred hereinafter as a "mechanical" motor or engine) with conventional electromagnetic engines (referred hereinafter as an "electrical" motor or engine). The implementation of hybrid technology is understood to come in either a series mode or parallel mode of operation.

In the series mode, the hybrid powerplant provides propulsion to the drive train exclusively through the electric motors. Though there is a mechanical motor, the mechanical motor provides no function other than running a generator to generate electricity for the battery which acts as the energy source and reservoir for supporting the electric motor(s). Therefore, in the series mode, the mechanical motor does not interface with the drive train.

Since the on-board battery is the direct source of energy for the electrical motor(s), it must be capable of storing a significant amount of energy to accommodate the vehicle's performance requirements. Under high performance conditions, the battery will be drained at a rapid rate. This problem is addressed by increasing the storage capacity of the battery and also increasing the "speed" of the mechanical motor to increase the rate of electricity being generated by the generator, thereby replenishing the battery. Nonetheless, in the series mode, the battery is understood to be necessarily large, thus becoming heavy, expensive, and unavoidably of limited lifetime.

In the parallel mode, both the mechanical engine and the electrical motor(s) engage the drive train. Depending on the driving conditions, the mechanical engine or the electrical motor (being powered by the battery) will be the only source of propulsion. Similar to the series mode, when the electrical motor(s) is running, the mechanical engine is run to replenish the battery's energy, via the generator. Consequently, the battery still remains the source of energy for the electrical motor(s). Therefore, the parallel mode suffers from the same problem of the series mode in that a large battery is required to meet all the performance requirements of the hybrid platform. The negative impact of the battery on either of these hybrid systems is evidenced by the large amount of research currently being conducted by automobile corporations into developing smaller, more powerful battery systems for running the electrical motors.

In both of these modes, when charging the battery, it is presumed that the mechanical motor will be operated at its peak efficiency so as to maximize the generation of electricity for storage in the battery. Thus, the generator is matched for the battery, not the electrical motor. Also, peak efficiency for a mechanical motor is known to be usually somewhere in the higher rpm range of the motor and not in the lower rpm range. Therefore, increased fuel costs will be incurred when charging the battery.

In view of the above implementations, hybrid methods and systems are disclosed wherein the need for a large battery or energy storage medium is obviated, as well as increased performance with the mechanical motor operating in idle, or near idle. Therefore, significant advantages can be found, including increased mileage over conventional systems.

SUMMARY

The foregoing needs are met, to a great extent, by the present subject matter, wherein methods and systems are provided that in some embodiments, a hybrid power plant for propelling a vehicle is provided, comprising: an internal combustion motor; a generator capable of producing electrical energy, mechanically coupled to the internal combustion motor; an electrical motor powered by the generator; and a controller coupled to the generator, providing a control of a rate of electricity provided to the electrical motor by the generator, wherein the electrical motor facilitates rotation a wheel of the vehicle and the internal combustion motor is operated at a near-idle speed to provide sufficient energy to be converted into electrical energy by the generator, enabling the electrical motor to propel the vehicle in excess of sixty miles per hour, without engaging the internal combustion motor to the wheel and without drawing energy from a battery.

In accordance with one aspect of the present subject matter, a method for propelling a vehicle is provided, and further comprising: operating an internal combustion motor; coupling a generator capable of producing electrical energy to the internal combustion motor; powering an electrical motor powered by the generator; and controlling a rate of electricity provided to the electrical motor by the generator, wherein the electrical motor facilitates rotation of a wheel of the vehicle and the internal combustion motor is operated at a near-idle speed to provide sufficient energy to be converted into electrical energy by the generator, enabling the electrical motor to propel the vehicle in excess of sixty miles per hour, without engaging the internal combustion motor to the wheel and without drawing energy from a battery.

In accordance with another aspect, a method for retrofitting a vehicle having a conventional single mode of propulsion engine to facilitate a hybrid mode of propulsion is provided, comprising: coupling a generator capable of producing electrical energy to an existing internal combustion motor in the vehicle; powering an electrical motor by the generator; and controlling a rate of electricity provided to the electrical motor by the generator, wherein the electrical motor facilitates rotation of a wheel of the vehicle and the internal combustion motor is operated at a near-idle speed to provide sufficient energy to be converted into electrical energy by the generator, thereby enabling the electrical motor to propel the vehicle in excess of sixty miles per hour, without engaging the internal combustion motor to the wheel and without drawing energy from a battery.

In accordance with yet another aspect of the present subject matter, a hybrid power plant for propelling a vehicle is provided, comprising: mechanical means for propulsion; generating means for generating electricity coupled to the mechanical means for propulsion; electromechanical means for propulsion powered by the means for generating electricity; and controlling means coupled to the generating means, wherein the controlling means controls a rate of electricity provided to the mechanical means by the generating means, wherein the mechanical means facilitates rotation of a wheel of the vehicle and the mechanical means is operated at a near-idle speed to provide sufficient energy to be converted into electrical energy by the generating means, thereby enabling the electromechanical means to propel the vehicle in excess of sixty miles per hour, without engaging the mechanical means to the wheel and without drawing energy from a battery.

DETAILED DESCRIPTION

Overview

Figure 1:
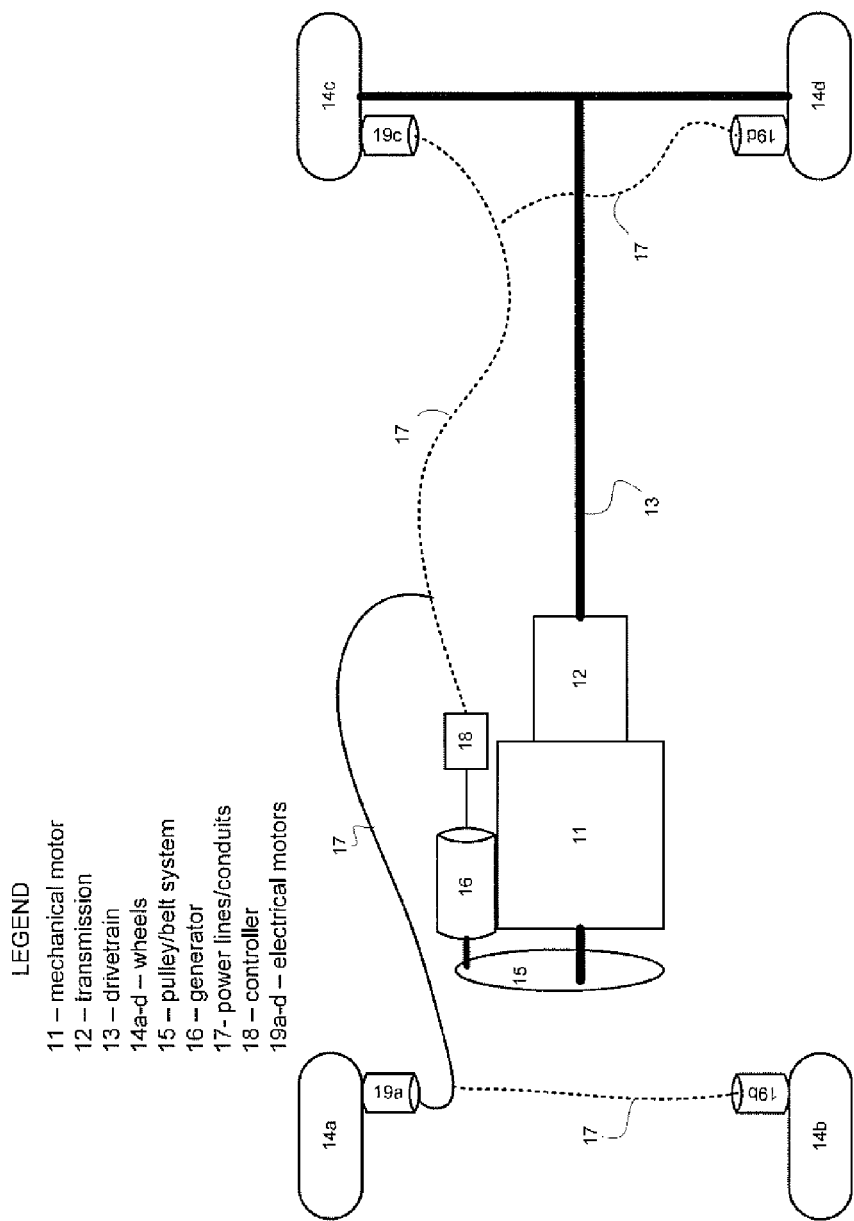
FIG. 1 is a diagram illustrating an exemplary configuration of an embodiment of the subject matter.

Several practitioners in hybrid systems have attempted to exploit the benefits of using an electrical motor by arranging it with the mechanical motor in various combinations. For example, U.S. Pat. No. 871,098 to M. Albrecht discloses a drive system that operates both a mechanical motor and electrical motor at the same time through the use of a dynamo and gear box. However, there is no suggestion of running the mechanical motor at idle, as a generator source, and enabling the electric motor to provide the primary mode of propulsion. Further, Albrecht uses intricate gear boxes and electric gear clutches to enable the dual mode operation which add to the overall weight of the vehicle.

U.S. Pat. No. 1,204,146 to Fend discloses a mechanical motor operating when the vehicle is moving at higher speeds and a shunt electric dynamo motor operating in combination with the mechanical motor when the vehicle is moving at slower speeds. Here, the electrical motor is not used at the higher speeds.

U.S. Pat. No. 1,064,089 to Rayner discloses a low speed electrical motor which receives its power from a driving shaft generator and high speed mechanical engine. Here, the electrical motor operates as the only source of propulsion.

U.S. Pat. No. 6,661,109 to Fukasaku discloses a four wheel drive vehicle, having a combination electric motor and mechanical motor. However, a battery storage system is disclosed with two generators.

The Electrocharger Publication, found at http://www.sigmaautomotive.com, describes a power adder that takes the place of the vehicle alternator and runs in parallel with the engine to increase the initial acceleration rate of the vehicle from idle. The device transfers power and torque from an electric motor to the crankshaft of the vehicle engine via a specialized toothed drive belt through a vehicle specific sprocket ratio. However, this system acts as power booster when the vehicle is at rest and also requires a battery system.

In all the above disclosures, significant weight is added in the drive train to enable the "combined" system to propel the vehicle. Also, large batteries are required to act as storage reservoirs to drive the electrical motors. The battery is used either as a primary or secondary source of energy for running the electrical motors. Given the limited lifetime of any battery, and the high maintenance cost associated with battery replacement, as well as increased weight for the vehicle (resulting in loss of performance and loss of available storage space) large batteries, though unavoidable in these systems, are necessary. Additionally, batteries are known to contain toxic materials and can have a significant impact on the environment when they are disposed.

Further, the above systems are not amenable to retrofitting current vehicle engine systems as they require a significant re-work of the vehicle drive train or propulsion system. Thus, all of these systems are deficient in that they are not easy to implement and do not provide the advantages of the methods and systems disclosed herein.

Description

FIG. 1 is a diagram illustrating an exemplary arrangement 10 of one embodiment of the subject matter. The exemplary arrangement 10 illustrates how a conventional rear-drive power plant having a mechanical motor 11, transmission 12, drive train 13, wheels 14a-14d, and pulley/belt system 15 may be outfitted to use the hybrid methods and systems described herein. In this exemplary embodiment, the pulley/belt system 15 may either be in its original form or modified, as needed, to accommodate an exemplary generator 16. The generator 16 is coupled to electrical motors 19a-d, via power lines/conduits 17 and is controlled by a controller 18. The generator 16 may be of a DC or AC design, depending on design and performance requirements. The generator 16 operation is particularly different from the typical generator found on conventional vehicles, as the generator 16 is not used for battery charging. Rather, as seen in this embodiment, the generator 16 is designated to drive the electrical motors 19a-d.

In one embodiment, a 10 kw belt driven generator NorthStar item number 165928-9806, rated up to 9600 running watts was used as the generator 16. Based on the configuration described herein, the generator 16 will generate sufficient energy while the mechanical motor 11 is at near idle speed to drive electrical motor 19a to propel a conventionally sized vehicle weighing, for example, in excess of 3400 pounds, in upwards of 60 miles per hour.

In FIG. 1, it is noted that four electrical motors 19a-d are illustrated as being attached to the wheels 14a-d, respectively, with the additional electrical motors 19b-d being shown as "optionally" attached to the generator 16, as indicated by the dashed power line/conduits 17. Thus, FIG. 1 illustrates an embodiment where the vehicle may be sufficiently propelled with only one electrical motor 19a, for example. In some embodiments, however, when a dual-drive or four-wheel drive operation is desired, various combinations of the additional electrical motors 19b-d may be implemented and the "dashed" power line/conduits 17 can be replaced with "solid" lines as an indication of actual connection. Also, depending on the electrical motors 19 used, the voltage and rating of the generator 16 can be increased or decreased.

It should be noted that in FIG. 1, electrical motors 19a-d are shown as attached in "parallel" to the generator 16 via power line/conduits 17. Of course, depending on the implementation, a series type connection may be used. Also, it is envisioned that in some embodiments, though a single wheel, for example 14a, can be the "powered" wheel, it may be possible to use multiple electrical motors (not shown) at wheel 14a. Additionally, while FIG. 1 illustrates the drive train 13 as connecting the mechanical engine 11 to the "rear" wheels 14c and 14d, the exemplary system may be implemented in a front-wheel drive system without departing from the spirit and scope of this subject matter.

FIG. 1 also illustrates a controller 18. The controller 18 operates to control the amount of current/power being delivered to the electrical motor(s) 19. The controller 18 facilitates "speed" control of the electrical motor(s) 19. When using AC electrical motors(s) 19, the controller 18 may be a single phase to three phase converter that adjusts the level and/or phasing of the electricity delivered to the electrical motor(s) 19. The controller 18 may be a variable frequency drive, for example, when using a three phase electrical motor 19 with single phase power coming in from the generator 16. The controller 18 may be coupled to or institute a variable current or power or resistance mechanism to control the amount of energy being transmitted to the electrical motor(s) 19.

In some embodiments, control of the energy transfer may be moderated by an accelerator pedal designated for control of the electrical motor. In some other embodiments, a potentiometer or similarly performing device may be used to arrive at the desired control. Yet, in some other embodiments, a combination or some modification of an accelerator control (whether foot-operated or hand-operated, or even automatic) may be used to provide the desired energy delivery control.

In tests performed by the inventor, a Leeson single phase electric, 5 hp, 1750 rpm electrical motor was used. The Leeson electrical motor operates on 230 volts, 50 amps. Though a Leeson electrical motor was used in the tests, it is understood that other brands, types and forms of electrical motors may be used without departing from the spirit and scope of this subject matter. Therefore, geared or non-geared motor(s) may be used, as well as AC or DC, and so forth.

In some embodiments, electricity from the generator 16 that is not channeled to the electrical motor(s) 19, may be channeled to the standard battery that is resident (not shown) in a conventional motor configuration. Accordingly, the generator 16 may replace, in some respects, the typical generator that is configured with conventional motor configurations. In this manner, conventional battery operations can be maintained for normal operation of the vehicle (for example, starter, radio, lights and so forth) when the mechanical engine 11 is not in operation. Accordingly, modifications to the power plant connections to convert a conventional motor configuration to the exemplary motor configuration 10 shown in FIG. 1, may be accomplished with less intervention or revision in the pulley/belt system of a conventional motor configuration. Thus, a conventionally-engined vehicle may be modified according to the descriptions provided herein, and still provide the expected features and conveniences associated with the vehicle.

In view of the description provided above, the exemplary configuration 10 is preferable over prior art hybrid methodologies as it can utilize "off the shelf" parts to provide the described performance(s). Also, because the electrical motor(s) 19 are sufficiently powerful, they may be adapted to two or four wheel drive vehicles running in an electric drive only mode, with the mechanical engine 11 operating at idle. As described above, with the generator 16, electrical motor(s) 19, and controller 18 properly matched, an exemplary-configured vehicle may be able to reach 60 or more miles per hour, with the mechanical motor 11 running only at idle speed or at a significantly reduced rpm, as compared to a conventionally-engined vehicle.

It should be understood that idle speed refers to the rotational or cycling speed of the mechanical engine that is consuming fuel while not providing vehicle propulsion. In some instances, the idle speed may be higher or lower depending on the type of load that the mechanical engine is experiencing. For example, if an air conditioning unit or other load is engaged, the engine may increase its idle accordingly. However, the increased idle speed is understood to not approach the maximum or even the median rotational speed of the engine. For example, for most mechanical piston based engines, the idle speed is around 400-1,000 revolutions per minute (rpm), with a maximum engine rpm of at least 5,000 or higher, depending on the type or size of the mechanical engine. Thus, the term idle speed is not a fixed number but a range of rpms that a mechanical engine operates within when in a particular mode of operation. Thus, based on this understanding, just above idle or near idle speed implies that this speed or rpm range is close to the idle speed, not exceeding the median speed or approaching the maximum rotational speed of the mechanical engine.

It should be also understood that while the embodiments described herein are described in the context of a conventional mechanical engine, that is, a piston engine, other engine types or paradigms may be used without departing from the spirit and scope of this subject matter. Thus, turbine, phase, Wankel, and other types of engines, and not necessarily using hydrocarbons as a fuel, may be used.

In some embodiments, it may be desirable to have, at different operating speeds or vehicle velocities, a parsing out of the electrical motor(s)'s 19 operation. For example, in one scenario, for low performance or non-four wheel drive operation, only the "front" electrical motor(s) 19a and/or 19b may be operating. In a higher performance mode, for example, four wheel drive, the rear wheels may be mechanically engaged by the mechanical engine 11 via the transmission 12 and drive train 13, with the front wheels still being engaged with the electrical motor(s) 19a and/or 19b. As mentioned above, the terminology of "front" and "rear" is relative, depending on the design implementation. For example, in front wheel drive engine platforms, the transmission couples the front wheels, rather than the rear wheels. Therefore, "front" and "rear" are terms dependent on the type of platform being modified, or the type of performance objectives desired. Therefore, modifications to the arrangement of the electrical motor(s) in view of the front/rear terminology may be performed without departing from the spirit and scope of this subject matter.

Figure 2:
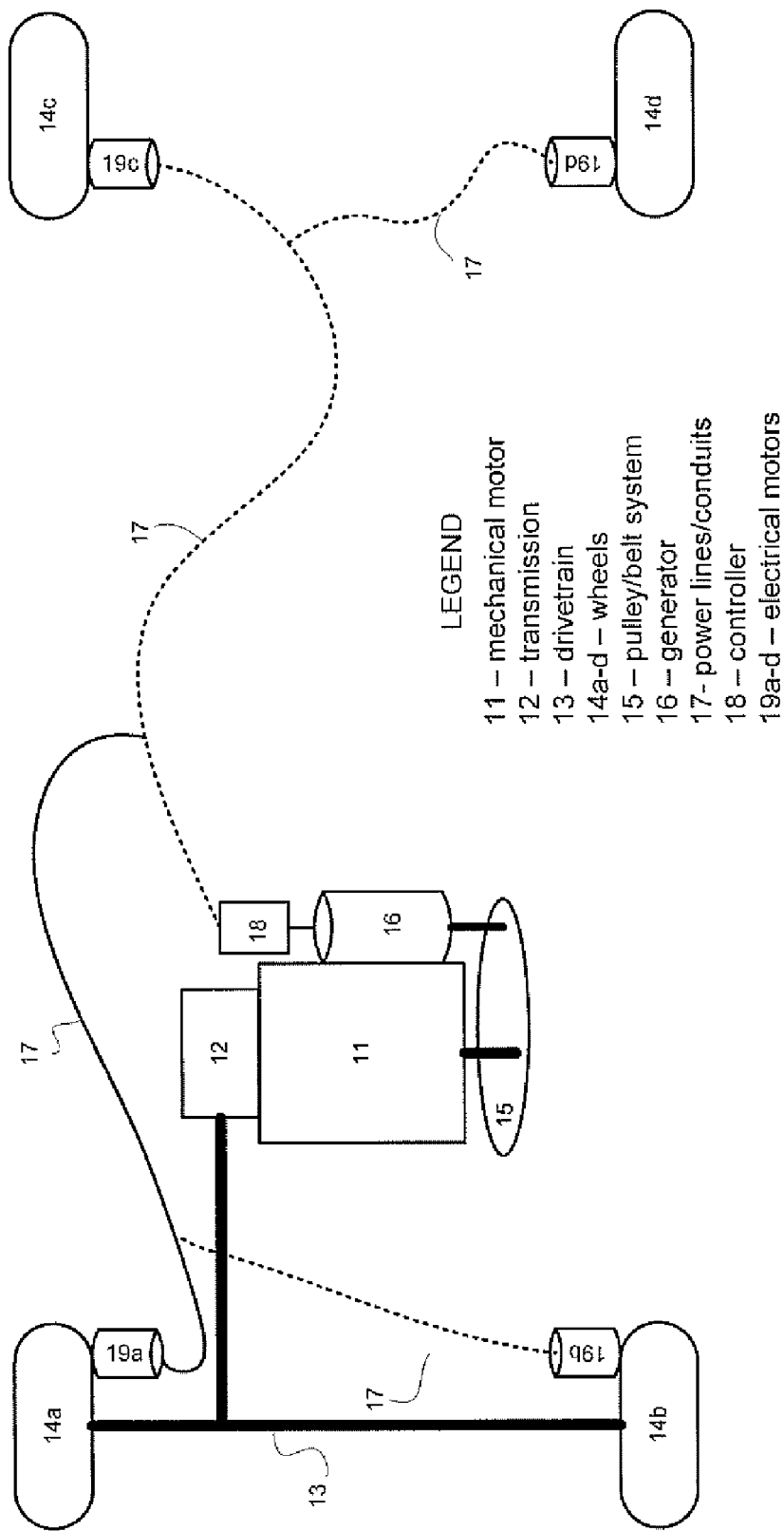
FIG. 2 is an illustration of another exemplary embodiment using a "front-wheel" drive power plant.

FIG. 2 is an illustration 20 of another exemplary embodiment using a "front-wheel" drive power plant. The primary difference from the embodiment of FIG. 1 is that the drive train 13 is coupled to the front wheels 14a-b.

Figure 3:
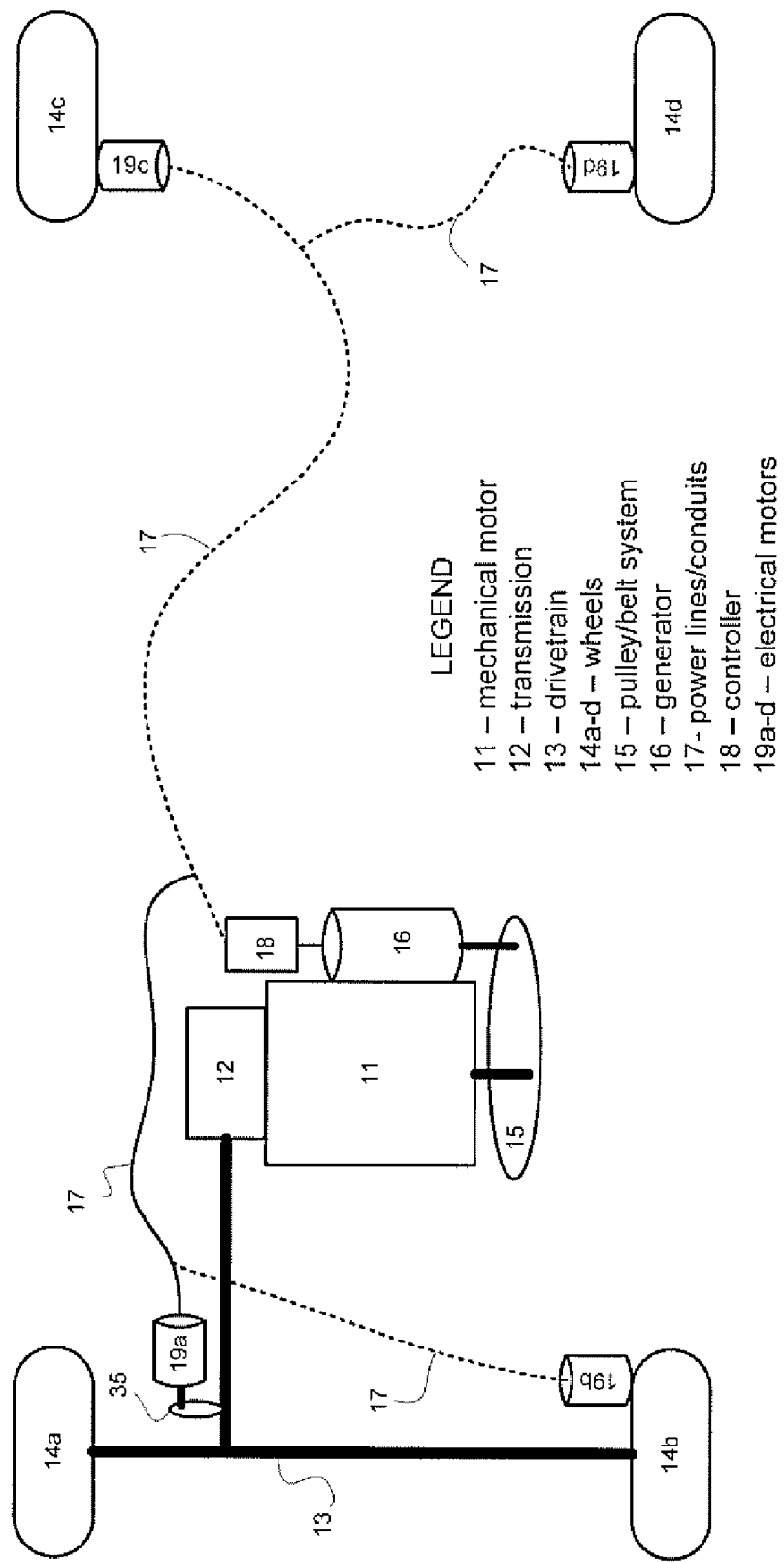
FIG. 3 is an illustration of another exemplary embodiment wherein the electrical motor(s) are attached to the drive train.

FIG. 3 is an illustration 30 of a modification of the embodiment of FIG. 2, wherein the electrical motor(s) 19 are attached to the drive train 13. Therefore, in some embodiments, the coupling of the electrical motor(s) rotation to the wheels 14 can be achieved by directly driving the drive train 13 or a portion of it rather than directly driving the wheels 14. It is understood that a mating system 35 or a gearing mechanism, such as a pulley or chain and so forth, may also be used to engineer different speed or performance requirements given a designated electrical motor 19 and/or generator 16.

It should be noted that variations of the placement of the electrical motor 19 may be contemplated without departing from the spirit and scope of this subject matter. For example, while the electrical motor 19 is shown in FIG. 3 as being attached to the drive train, for example, the drive shaft, it may be attached to another element of the drive train, for example, the transmission 12. Thus, placement of the electrical motor 19 may be altered depending on the design and performance objectives.

Based on the ability to propel a vehicle using the electrical motor(s) 19 coupled to a generator 16 whose energy transmission is controlled by a controller 18, with the generator 16 being powered by a mechanical motor 11 operating at an idle speed or near idle speed, it is estimated that a possible gasoline consumption rate of a quarter to a half gallon per hour is possible. Presuming that the vehicle is traveling at approximately an average speed of 60 miles per hour with the mechanical engine at idle or near idle, the resulting increase in gas efficiency is tremendous. And without the added weight of hybrid-sized storage batteries or significant modifications to the existing power plant of a conventional engine, the weight of the vehicle is not substantially increased or the performance compromised.

It should be understood that by utilizing the configuration and arrangement of equipment, as described herein, modifications to a variety of mechanically propelled vehicles may be made with little intervention. For example, the exemplary embodiments may be implemented in a tractor, a motorcycle, a three-wheeled vehicle, tank, ship, and so forth. Accordingly, the electrical motor(s) 19 are not restricted to propelling only a wheel, as other forms of traction-based or force-based means may be used. Other possible modifications include: a four wheel drive vehicle may be modified by attaching the electrical motor(s) 19 to the rear drive shaft; on two wheel drive vehicles, it possible to attach the electrical motor(s) to the drive shaft or CV joints for motion. Or the electrical motor may simply attached it to a wheel that not connected to the vehicle's drive system and the vehicle's transmission may be placed into neutral.

Several advantages of the exemplary embodiments are evident as summarized below:
 a. Safer than alternative energy such as hydrogen.
 b. Better gas mileage. Gas electric hybrids of today use the mechanical engine much more than the disclosed exemplary embodiments, reducing their mileage.
 c. Less parts equals less weight (which also means less cost easier to assemble, and better fuel economy).
 d. Potentially less repairs. By utilizing the electrical motor, less wear is generated on the mechanical engine, not to mention wear in typical hybrid power plants.
 e. Less emissions from increased fuel efficiency.
 f. Less costly to build.
 g. Simple retrofit of existing vehicles.
 h. Is adaptable to any size or type of vehicle.
 i. Can be easily transplanted/re-used from one vehicle to another.

It will be understood that many additional changes in the details, materials, steps and arrangement of parts, which have been herein described and illustrated to explain the nature of the subject matter, may be made by those skilled in the art within the principle and scope of the subject matter as expressed in the appended claims.

What is claimed is:

1. A hybrid power plant system for propelling a commercially obtainable automobile, comprising:
 an internal combustion (IC) motor existing in a commercially obtainable automobile, the IC motor sized by a manufacturer of the commercially obtainable automobile for conventional highway/roadway travel using mechanical only force coupled from the IC motor to a wheel;
 a generator capable of producing electrical energy, mechanically coupled to the IC motor;
 an electrical motor powered by the generator and coupled to the wheel; and
 a controller coupled to the generator, providing a control of a rate of electricity provided to the electrical motor by the generator,
 wherein the electrical motor facilitates rotation of the wheel of the commercially obtainable automobile and the IC motor is operated at a speed substantially equivalent to the IC motor's idle speed, providing sufficient energy to be converted into electrical energy by the generator, thereby enabling the electrical motor to propel the commercially obtainable automobile in excess of approximately sixty miles per hour in under 15 seconds, without engaging the IC motor to the wheel and without drawing energy from a battery.

2. The hybrid power plant system of claim 1, wherein the commercially obtainable automobile weighs in excess of 3400 pounds.

3. The hybrid power plant system of claim 1, wherein a mileage performance metric per fixed volume of fuel is greater than 60 miles per gallon for a combined highway and city mode of operating the commercially obtainable automobile.

4. The hybrid power plant system of claim 1, wherein the electrical motor is attached to a drive shaft of the commercially obtainable automobile.

5. The hybrid power plant system of claim 1, further comprising a pulley coupling the IC motor with the generator.

6. The hybrid power plant system of claim 1, wherein the existing IC motor is a replacement motor substantially equivalent to the existing IC motor.

7. A method for propelling a commercially obtainable automobile, comprising:
 operating an internal combustion (IC) motor existing in a commercially obtainable automobile, the IC motor sized by the automobile manufacturer for conventional highway/roadway travel using mechanical only force coupled from the IC motor to a wheel;
 coupling a generator capable of producing electrical energy to the IC motor;
 powering an electrical motor coupled to the wheel, by the generator; and
 controlling a rate of electricity provided to the electrical motor by the generator,
 wherein the electrical motor facilitates rotation of the wheel of the commercially obtainable automobile and the IC motor is operated at a speed substantially equivalent to the IC motor's idle speed, providing sufficient energy to be converted into electrical energy by the generator, thereby enabling the electrical motor to propel the commercially obtainable automobile in excess of approximately sixty miles per hour in under 15 seconds, without engaging the IC motor to the wheel and without drawing energy from a battery.

8. The method of claim 7, wherein the commercially obtainable automobile weighs in excess of 3400 pounds.

9. The method of claim 7, wherein a mileage performance metric per fixed volume of fuel is greater than 60 miles per gallon for a combined highway and city mode of operating the commercially obtainable automobile.

10. The method of claim 7, wherein the electrical motor is attached to a drive shaft of the commercially obtainable automobile.

11. The method of claim 7, wherein the coupling between the generator and the IC motor is facilitated by a pulley system.

12. The method of claim 7, wherein the existing IC motor is a replacement motor substantially equivalent to the existing IC motor.

13. A hybrid power plant system for propelling a commercially obtainable automobile, comprising:
 internal combustion (IC) mechanical means for propulsion sized by a manufacturer of a commercially obtainable automobile for conventional highway/roadway travel using mechanical only force coupled from the mechanical means to a wheel;
 means for generating electricity coupled to the IC mechanical means;

electromechanical means for propulsion, coupled to the wheel, powered by the means for generating electricity; and controlling means coupled to the generating means, wherein the controlling means controls a rate of electricity provided to the IC mechanical means by the means for generating electricity, wherein the mechanical means facilitates rotation of the wheel of the commercially obtainable automobile and the mechanical means is operated at a speed substantially equivalent to the mechanical means' idle speed, providing sufficient energy to be converted into electrical energy by the means for generating electricity, enabling the electromechanical means to propel the commercially obtainable automobile in excess of approximately sixty miles per hour in under 15 seconds, without engaging the mechanical means to the wheel and without drawing energy from a battery.

14. The hybrid power plant system of claim 13, wherein the commercially obtainable automobile weighs in excess of 3400 pounds.

15. The hybrid power plant system of claim 13, wherein a mileage performance metric per fixed volume of fuel is greater than 60 miles per gallon for a combined highway and city mode of operating the commercially obtainable automobile.

16. The hybrid power plant system of claim 13, wherein the mechanical means is attached to a drive shaft of the commercially obtainable automobile.

17. The hybrid power plant system of claim 13, further comprising a belt coupling means between the mechanical means and the means for generating electricity.

18. The hybrid power plant system of claim 13, wherein the mechanical means is a replacement mechanical means substantially equivalent to the mechanical means.

* * * * *